United States Patent
Vallet (10) Patent No.: US 7,630,467 B2
(45) Date of Patent: *Dec. 8, 2009

(54) DATA RECOVERY CIRCUITS USING OVERSAMPLING FOR BEST DATA SAMPLE SELECTION

(75) Inventor: Vincent Vallet, Mennecy (FR)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/061,956

(22) Filed: Apr. 3, 2008

(65) Prior Publication Data

US 2008/0187079 A1 Aug. 7, 2008

Related U.S. Application Data

(63) Continuation of application No. 10/904,693, filed on Nov. 23, 2004, now Pat. No. 7,406,142.

(30) Foreign Application Priority Data

Dec. 19, 2003 (EP) .................................. 03368124

(51) Int. Cl.
  *H04L 7/00* (2006.01)
  *H04L 25/00* (2006.01)
  *H04L 25/40* (2006.01)

(52) U.S. Cl. .................... 375/371; 375/355; 375/348

(58) Field of Classification Search ................ 375/355, 375/371, 348, 354; 714/12; 358/409
See application file for complete search history.

(56) References Cited

U.S. PATENT DOCUMENTS

| | | | | |
|---|---|---|---|---|
| 4,635,049 A | * | 1/1987 | Dodge et al. | 345/550 |
| 7,221,725 B2 | * | 5/2007 | Tinker | 375/355 |
| 2002/0178285 A1 | * | 11/2002 | Donaldson et al. | 709/237 |
| 2004/0062362 A1 | * | 4/2004 | Matsuya | 379/56.1 |
| 2004/0096016 A1 | * | 5/2004 | Choudhury et al. | 375/340 |

* cited by examiner

*Primary Examiner*—Shuwang Liu
*Assistant Examiner*—Brian J Stevens
(74) *Attorney, Agent, or Firm*—Ian D. MacKinnon (57) ABSTRACT

An improved data recovery circuit based on an oversampling technique to select the best data sample to be kept as the data to recover that is only based on accumulating the data edges (or transitions). The incoming serial data stream with jitter is oversampled in an oversampling circuit by means of the multiple phases of a reference clock (clk) to produce data samples. Each sample is compared to the sample(s) collected with the next clock phase(s) in an edge detector circuit to determine the presence of a data edge and the edge information is stored and accumulated in a data edge memory. A selection determination circuit uses the memorized edge information to indicate which sample is the farthest from the data edges. A selection validation circuit validates the selection to avoid false determination due to jitter and skew.

4 Claims, 6 Drawing Sheets

DATA RECOVERY CIRCUITS USING OVERSAMPLING FOR BEST DATA SAMPLE SELECTION

REFERENCE TO RELATED APPLICATION

This application is a continuation of currently co-pending U.S. patent application Ser. No. 10/904,693, which claimed priority from French Patent Application 03368124.8 2415. The content of both related application Ser. Nos. 10/904,693 and 03368124.8 2415 are incorporated by reference herein in their entirety.

BACKGROUND OF THE INVENTION

The present invention relates to high speed serial communications/data transfers between integrated circuits or systems and more particularly to a method and circuit for implementing the best data sample selection in a data recovery circuit based on an oversampling technique when the incoming data stream suffers from jitter and is skewed with respect to the reference clock.

In the field of high speed serial communications/data transfers between integrated circuits or systems, data recovery circuits are extensively used. Let us assume the presence of a separate oversampling circuit generating a plurality of data samples during each bit period. We also assume the presence of an edge detector circuit able to detect the occurrence of a data transition between two consecutive data samples. The best sample to represent the recovered data is the sample which is the farthest from the data edges (or data transitions).

Figure 1:
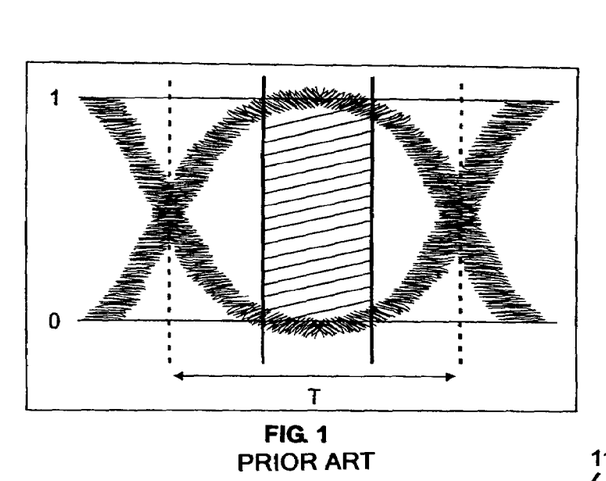
FIG. 1 shows a typical eye diagram showing a jittered data.

FIG. 1 shows a typical eye diagram for a high speed serial data link. Data jitter or phase error (skew) between clock and data thus significantly reduce the useful sampling window. One can notice that the reliable sampling window (hatched area) corresponding to the zone where the data bit is guaranteed to be stable can be significantly shorter than the bit period T. Furthermore, circuit process deviations, operating temperature and power supply variations can also have a negative impact on sampling window width and thus on the targeted circuit accuracy.

The selection of the best sample generally relies on a training pattern specific to the data communication protocol in consideration. The training pattern is used during a calibration step to determine which clock phase is the best to recover the data and this calibration step is repeated whenever required. As a consequence, a data recovery circuit built for a given communication data protocol is generally not suitable to recover data sent using a different data communication protocol since it will be unable to recognize the training pattern and thus to select the best data sample.

On the other hand, the duration of the training patterns is relatively short compared to the data duration and therefore are not representative of the jitter affecting the data. Moreover, when there is a low number of physical links, it is possible to use phase locked loop oscillators (PLLs) to individually recover the data stream by locking the PLL frequency on the data stream frequency and by generating a sampling clock positioned right in the middle of the data bit. However as soon as there is a large number of data links to handle, it becomes impossible to implement as many PLLs as data links. Finally, the different data link signals may be skewed together by a relatively large amount of time for layout or fabrication process reasons so that it is not possible to reliably sample each data link using a same clock phase.

Consequently, there is a need for an improved data recovery circuit that would be independent of any data communication protocol and capable to support jitter undesirable effects and skew, i.e., the phase difference between any data link signal and an arbitrary synchronous reference clock.

BRIEF SUMMARY OF THE INVENTION

It is therefore an object of the present invention to provide an improved data recovery circuit the operation of which is independent from the data communication protocol in consideration because it only relies on data transitions.

It is another object of the present invention to provide an improved data recovery circuit that is able to handle a great number of data links without implementing as many PLLs as there are data links.

It is another object of the present invention to provide an improved data recovery circuit that allows one to reliably sample each data link among a plurality of data links using a same clock source, so that any phase difference (skew) between a data link signal and an arbitrary synchronous reference clock can be supported.

It is another object of the present invention to provide an improved data recovery circuit that allows one to reliably sample an incoming data stream suffering from jitter.

It is another object of the present invention to provide an improved method for selecting the best data sample from a set of data samples that result from oversampling the data to recover.

According to the present invention there is described an improved method and circuit for implementing the best data sample selection in a data recovery (DR) circuit based on an oversampling technique when the incoming data stream suffers from jitter and skew. The data to recover is first oversampled using the multiple phases of a reference clock to generate a set of data samples. An edge detection circuit is used to locate the position of edges in the set of data samples. A data edge memory memorizes the bit edge positions. A selection determination circuit provides selection signals to indicate which data sample is the farthest from the bit edges. A selection validation circuit validates the selection signals to avoid any false determination in the selection signals. Validated selection signals are stored in a selection memory. Finally, a data sample selection circuit processes both the data samples and the memorized validated selection signals to determine which data sample is the best candidate to recover the data.

The performance of a data recovery circuit being tied to its jitter tolerance, the improved DR circuit that is able to store the position of data edges over a long period of time, can therefore take into account the data jitter to select the best sample. In addition, because the choice of the best data sample only depends on data transitions, the improved DR circuit does not rely on any training pattern and thus is totally independent of the data communication protocol. Finally, the data recovery mechanism of the present invention is also independent of the number of data links.

BRIEF DESCRIPTION OF THE INVENTION

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 2:
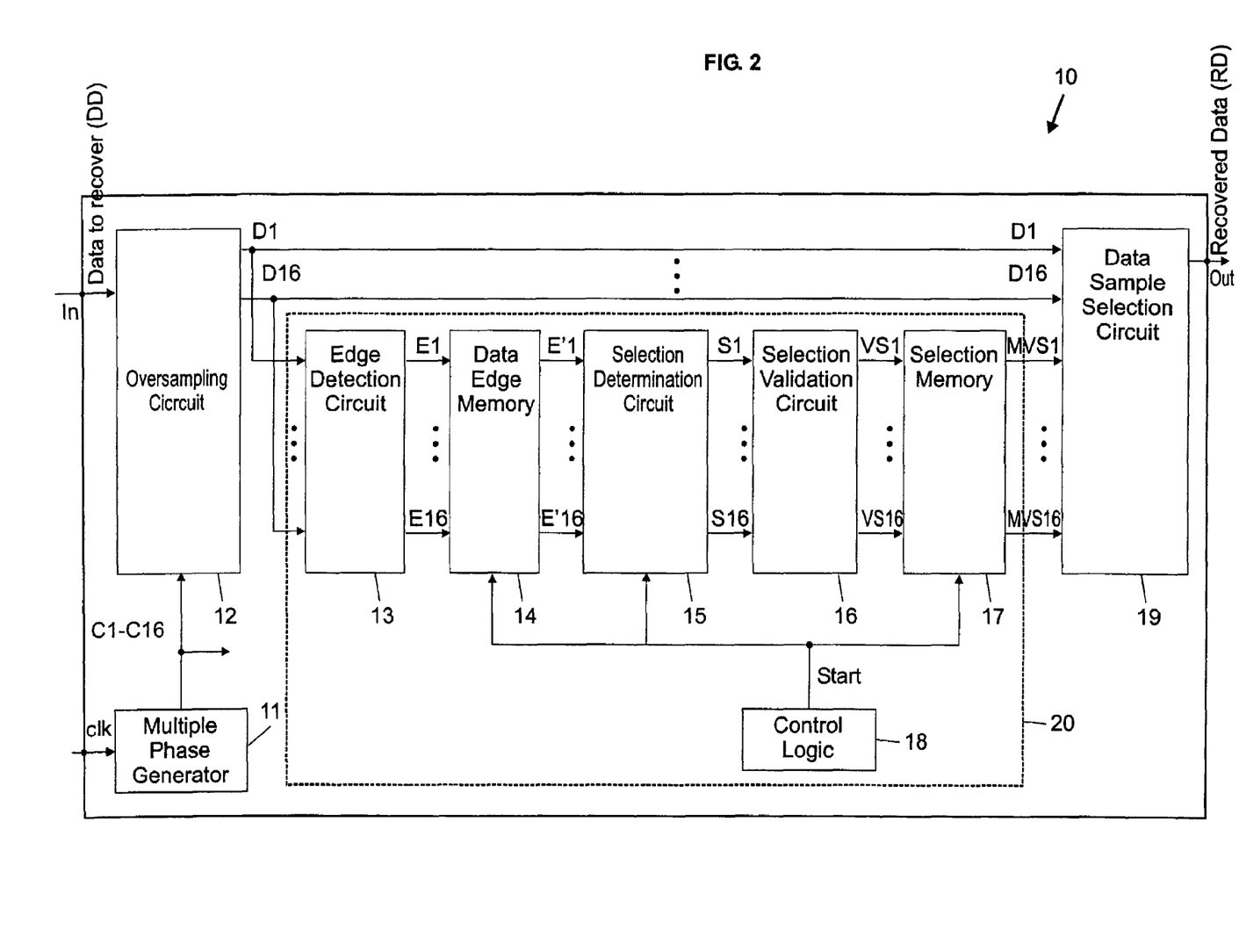
FIG. 2 is a block diagram of the improved data recovery circuit according to a preferred embodiment of the present invention.

A preferred implementation of the improved data recovery circuit using oversampling for best data sample selection according to the present invention is shown in FIG. 2 where it bears numeral 10. The disclosed circuit and method operate independently of the number of data links so that the data recovery mechanism of the present invention will be only described herein below for one data link.

Referring to FIG. 2, the improved data recovery circuit 10 first includes a multiple phase generator 11 driven by a reference clock synchronized with the data link. The multiphase clock generator 11 is required to generate an adequate number n of clock phases, e.g., 16 in the present implementation, referenced $C_1$ to $C_{16}$, that are derived from a reference clock labeled clk. The multiple phases are applied to an oversampling circuit 12 (and to other circuits whenever necessary) that receives the stream of serial data to recover at the In terminal to generate data samples, referenced $D_1$ to $D_{16}$.

It further includes an edge detection circuit 13, a data edge memory 14, a selection determination circuit 15, a selection validation circuit 16, and a selection memory 17 that are connected in series. Control logic circuit 18 plays the role of a state machine vis ávis some blocks. Logic circuits and memories 13 to 18 form the so-called decision circuit referenced 20. Finally, the data samples $D_1$ to $D_{16}$ and the signals $MVS_1$ to $MVS_{16}$ output by the selection memory 17 are applied to data selection circuit 19.

The incoming stream of serial data is continuously oversampled in oversampling circuit 12 by means of the multiple phases of the reference clock. Each data sample is compared in edge detector circuit 13 to the data sample collected with the next adjacent clock phase to determine the presence of a data edge or transition and the edge information, i.e., the edge positions, is collected in data edge memory 14 for a duration that can be tuned. This data edge memory 14 can be cleared at regular time intervals. Tuning and clearing are performed by control logic circuit 18.

The selection determination circuit 15 uses the memorized edge information to indicate which data sample is the farthest from the data edges. Selection validation circuit 16 has the key role of validating the selection to avoid false determination due to jitter and skew. The validated values of the selection signals are memorized in selection memory 17, so that these values can be used while new data edges are processed and new selection signals are updated. Finally, the memorized validated selection signals $MVS_1$ to $MVS_{16}$ and the data samples $D_1$ to $D_{16}$ are exploited in data selection circuit 19 to recover the data.

As apparent in FIG. 2, the recovered data RD is available at the Out terminal. Block 20, which is composed of a plurality of logic circuits and memories, will be referred to hereafter as the decision circuit. The decision circuit is thus based on the detection of data edges or transitions in the set of data samples to drive the data sample selection circuit 19 in order to select the best sample to be kept, i.e. the recovered data RD.

Description of the Multiphase Clock Generator 11

The preferred implementation uses a phase locked loop oscillator (PLL) to generate n=16 multiple phases of a reference clock. The clock frequency can be the same as the data frequency, i.e. one data bit per clock period or half of the data frequency, i.e. two data bits per clock period, also referred to as single data rate (SDR) or double data rate (DDR) respectively. The reference clock may be synchronously transmitted by the distant apparatus or may be recovered from the data stream using standard clock recovery circuits.

Figure 3:
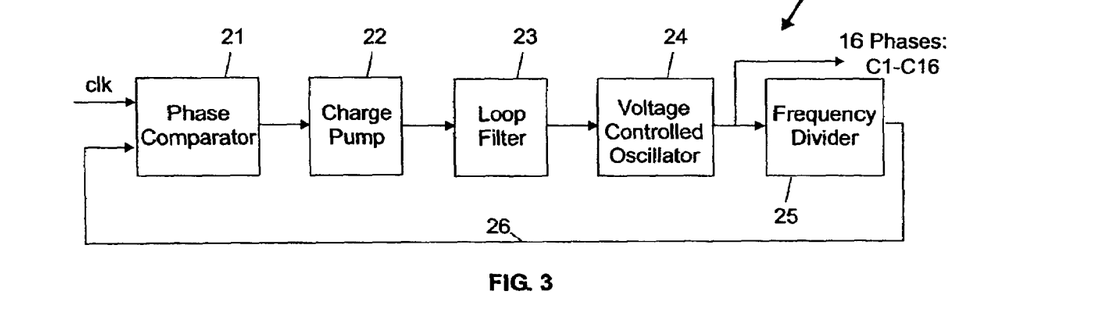
FIG. 3 is a circuit diagram of the multiple phase generator of FIG. 2 using a standard phase locked loop (PLL) oscillator designed to generate N=16 phases.

A conventional PLL based multiphase clock generator is shown in FIG. 3 where it bears numeral 11. Now turning to FIG. 3, the reference clock signal clk and the loop signal that is internally generated by the PLL circuit 11 are applied to the phase comparator 21, which in turn generates a signal that is supplied to a charge pump 22. The latter outputs a controlled signal that is fed to a voltage controlled oscillator (VCO) circuit 24 via a loop filter 23. The VCO circuit 24 is coupled to a frequency divider 25 that supplies the loop signal on line 26. The desired number N of oversampling clock phases, sixteen in the instant case, obtained either on the rising edge or the falling edge of the reference clock, are referenced $C_1$ to $C_{16}$.

2. Description of the Oversampling Circuit 12

Figure 4:
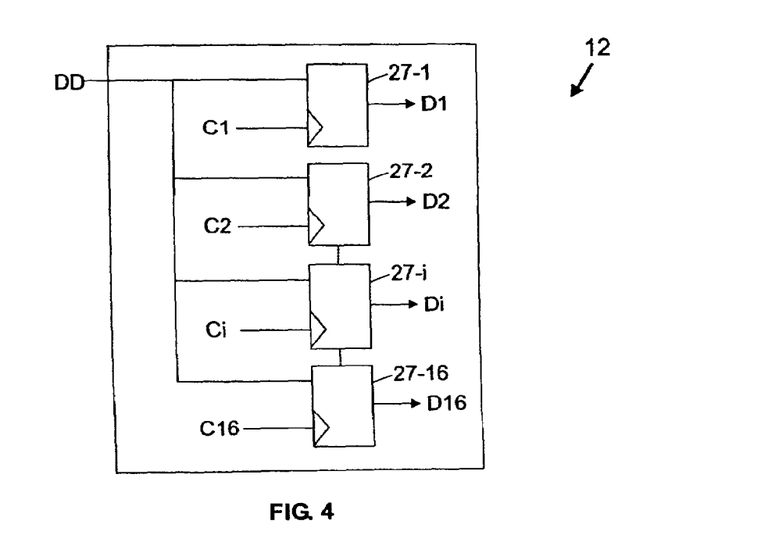
FIG. 4 is the circuit diagram of the oversampling circuit of FIG. 2.

The oversampling circuit 12 collects either one bit (SDR) or two consecutive bits (DDR) in sixteen samples. The sampling is done on each phase $C_1$ to $C_{16}$. An example of a simple implementation of oversampling circuit 12 is shown in FIG. 4. Now turning to FIG. 4, oversampling circuit 12 includes 16 flip-flops 27-1 to 27-16 that are respectively controlled by the sixteen phases $C_1$ to $C_{16}$. $D_1$ to $D_{16}$ represent the 16 data samples available at the output of their respective flip-flop.

Description of the Edge Detection Circuit 13

The edge detection circuit 13 is directly connected at the oversampling circuit 12 output and is responsible to detect a value change between two consecutive data samples. Now turning to FIG. 5, the edge detection circuit 13 is made of 16 edge detection elements, each one corresponding to a data sample. Let us consider edge detection element EDi, it consists of a XOR gate 28-$i$ that compares the two consecutive data samples Di and Di+1. The comparison result Ei, i.e. the edge information, is stored in a flip-flop 29-$i$ clocked by the same clock phase Ci as the first of the two samples to be compared.

Figure 5:
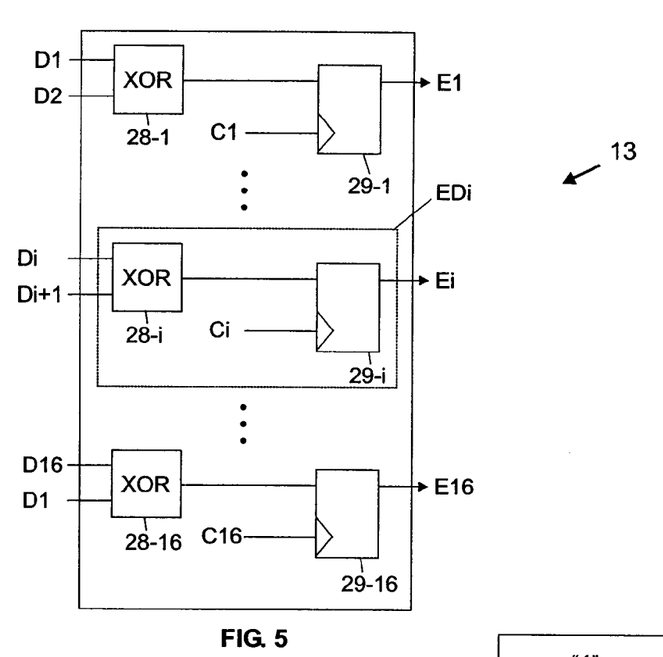
FIG. 5 is the circuit diagram of the edge detection circuit of FIG. 2.

There are as many edge detection elements as there are data samples. When a data transition is detected between two consecutive data samples, the edge detection element output switches to the '1' level during a single clock period. As it will be better understood later on, to allow data selection circuit 19 to select the best data sample to recover, the edge information is collected during an extended period of time so that the data jitter with regards to oversampling clock phases is taken into account.

Description of the Data Edge Memory Block 14

The data edge memory block 14 is directly connected at the edge detection circuit 13 output. Now turning to FIG. 6, the data edge memory block 14 is made of 16 data edge memory elements, each one corresponding to a data sample. Thus, there are as many data edge memory elements as there are edge detection elements. The data edge memory block 14 is a first key feature of the present invention. Let us consider data edge memory element DEMi, it mainly consists of an asynchronous reset flip-flop (or a similar register element) 30-$i$ which has its data input permanently set to '1' and its clock input connected to a reset signal RC. The RC clock signal generated by the control logic circuit 18, is a pulse used to reset periodically every data edge memory elements at the '1' value.

Figure 6:
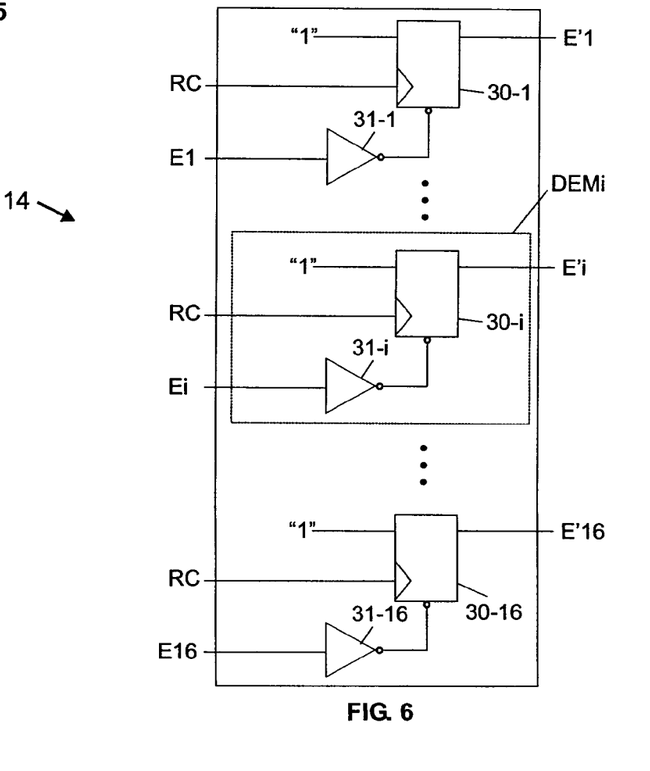
FIG. 6 is the circuit diagram of the data edge memory of FIG. 2.

In the preferred implementation, the RC signal period or edge sampling period, is tuned in a configuration register (not shown). The edge information signal Ei is applied to the asynchronous input via an inverter 31-$i$. In this preferred implementation, any edge information signal Ei at the '1' level, i.e. indicating the presence of a data edge, sets a '0' level in the corresponding flip-flop 30-$i$. The signal latched in flip-flop 30-$i$, labeled E'i, at this '0' level, is kept for an extended length of time such as several tenths or hundreds of clock periods.

One advantage of using an asynchronous reset flip-flop is that it allows one to collect data edge events during such an extended period of time very easily, however other implementations could be envisioned as well. Another advantage is that it collects the edge information independently of their related oversampling clock phase. As a significant result, all signals derived therefrom could be exploited with a determined oversampling clock phase, e.g. $C_1$. In this preferred implementation, sixteen phases of a reference clock are thus used to collect sixteen data samples during each clock period.

The following examples illustrate the values of the $E'_1$ to $E'_{16}$ signals for different cases.

Example 1 represents E' values for single data rate (SDR) data without jitter. The position of the single '0' corresponds to the sample position where a data transition was detected.

1 1 1 1 1 0 1 1 1 1 1 1 1 1 1 1

Example 2 represents E' values for single data rate (SDR) data with jitter. The transition position varies in time due to the presence of jitter, so that more than one data transitions are detected.

1 1 1 0 0 0 1 1 1 1 1 1 1 1 1 1

The zone filled with '0's corresponds to the grayed zone in the eye diagram of FIG. 1. Example 3 represents E' values for double data rate (DDR) data without jitter. As there are now two bits of data per clock period, two data transition positions were detected.

1 1 1 1 1 0 1 1 1 1 1 1 1 0 1 1

Example 4 represents E' values for DDR data with jitter. The presence of jitter on the incoming data stream has the effect of moving the detected data edge randomly around a central position. The effect on the E' values is to increase the width of the zones with adjacent '0's.

1 1 1 1 0 0 0 1 1 1 1 1 0 0 0 1

Therefore, the edge information is presented under the form of a bit map. A bit set to '0' indicates that a data edge has been detected at this corresponding sample position during the duration of a previous edge search and a bit set to '1' indicates a sample position where no data edge was seen during the same duration. Assuming a reasonable level of jitter and further assuming the edge information is collected for a long duration compared to the data bit period, then the bit map appears as one zone (SDR) or two zones (DDR) filled with adjacent '0's (corresponding to the zone where data edges were detected) surrounded by adjacent '1's. The last bit map position is considered as adjacent to the first bit map position and conversely. Therefore, in the case of DDR data, the bit map contains two zones filled with '0's separated by zones filled with '1's and in the case of SDR data, the bit map contains one zone filled with '0's surrounded by a zone filled with '1's.

5. Description of the Selection Determination Circuit 15

The selection determination circuit 15 is directly connected at the data edge memory block 14 output and has the essential role of determining which data sample(s) is (are) to be kept. It uses the memorized edge information to indicate which sample is the farthest from the data edges. At the input of this circuit, the edge information is thus presented under the form of a bit map with as many bits as there are samples. The selection determination circuit locates the edges of the zone(s) filled with '1's and progressively reduces the width of the zone until it only contains only one '1's. As this width reduction is performed alternatively on each side, then the remaining '0' points to the center of the zone where none data edge was located, i.e. it points to the data sample which is the farthest from the data edge position.

To recover the data when the incoming data stream is jittered, it is important to select the sample (in case of SDR data) or the samples (for DDR data) located the farthest from any possible position of a data edge. Looking now at the E' values shown in the above examples, selecting the best sample corresponds to localizing the middle of the zone filled with '1's. This is done with the repetition of the two-step algorithm described below.

In a first step, the particular pattern 110 is searched in the suite of the E' values to locate the right side of a zone filled with '1's. In the search for this right pattern (RP), the right most value of the suite of the E' values ($E'_{16}$ in this preferred implementation) is considered to be adjacent with the leftmost value of the suite of E' value (i.e. $E'_1$). Each time the 110 RP pattern is found, it is replaced by the 100 value, so that it effectively decreases the width of the zone filled with '1's by one unit and by the right side of the zone.

The second step of the algorithm searches for the 011 pattern which is characteristic of the left side of a zone filled with '1's in the suite of E' values. Similarly, in the search for this left pattern (LP), the leftmost value of the suite of the E' values ($E'_1$ in the preferred implementation) is considered to be adjacent with the rightmost value of the suite of E' values (i.e. $E'_{16}$). Each time the 011 LP pattern is found, it is replaced by the 001 value so that it effectively decreases the width of the zone filled with '1's by one unit and by the left side of the zone. This algorithm is repeated by successive iterations until the width of the zone filled with '1's is reduced to a single position, in other words it just remains one '1' (approximately, the central one in the zone).

When recovering SDR data, only one '1' value is found and this single value correspond to the position of the best sample to be kept as the recovered data. When recovering DDR data, two different '1's are kept corresponding to the positions of the best samples to be kept as the data to recover in the incoming data stream.

Figure 7:
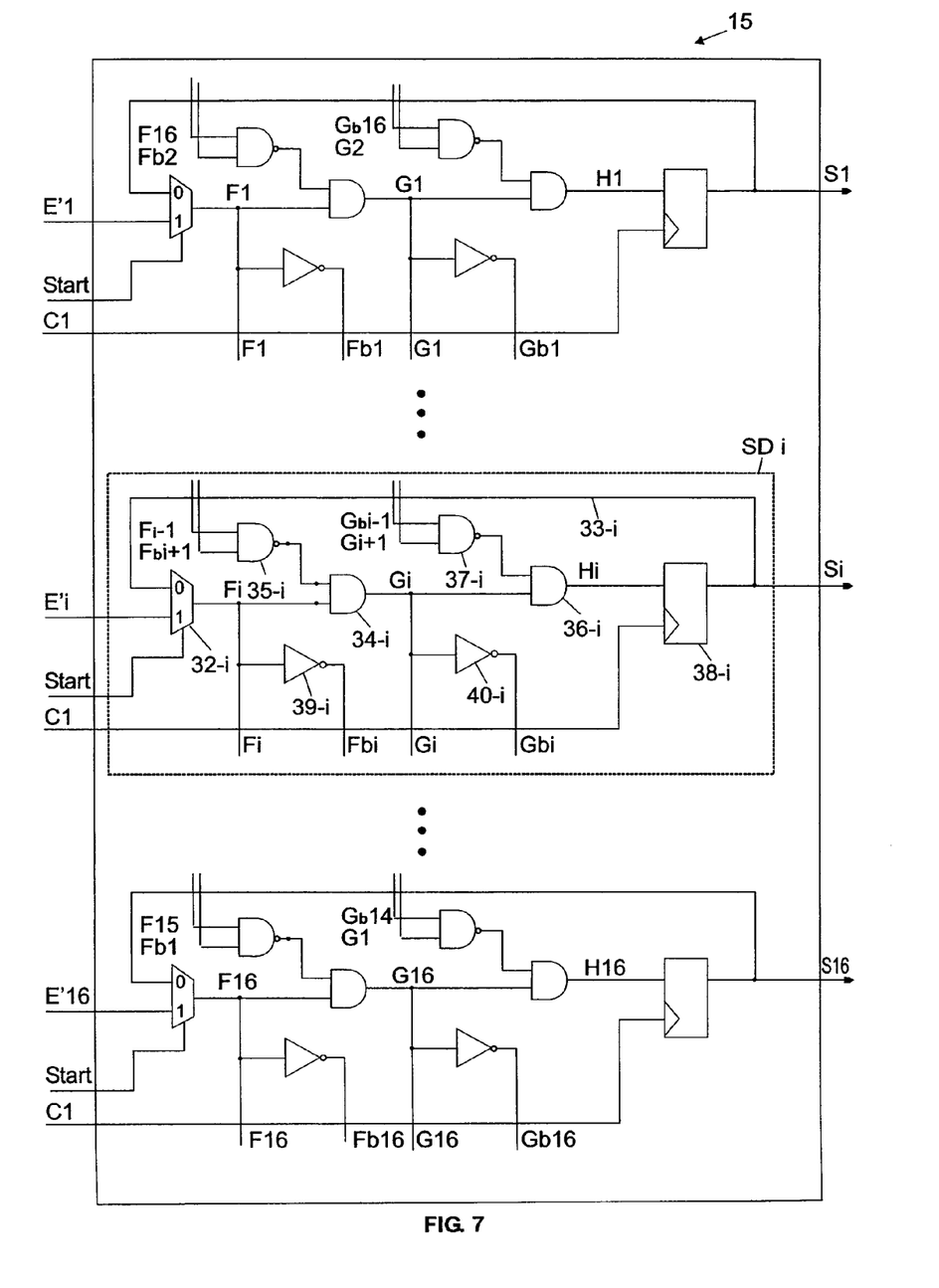
FIG. 7 is the circuit diagram of the selection determination circuit of FIG. 2.

FIG. 7 shows a preferred hardware implementation of the above described algorithm that functionally performs these operations. The selection determination circuit 15 is another key feature of the present invention. Now turning to FIG. 7, the selection determination circuit 15 is made of sixteen selection determination elements SDi (i=1 to 16), each one corresponding to a data sample. Thus, there are as many selection determination elements as there are data edge memory elements.

Let us consider Example 2 for the sake of simplicity, applying the above two-step algorithm to process the initial bit map, will result in the following bit sequences:
1 1 1 1 0 0 0 1 1 1 1 1 1 1 1 1
1 1 1 0 0 0 0 1 1 1 1 1 1 1 1 1 ($1^{st}$ step RP, $1^{st}$ iteration)
1 1 1 0 0 0 0 0 1 1 1 1 1 1 1 1 ($2^{sd}$ step LP, $1^{st}$ iteration)
1 1 0 0 0 0 0 0 1 1 1 1 1 1 1 1 ($1^{st}$ step RP, $2^{sd}$ iteration)
1 1 0 0 0 0 0 0 0 1 1 1 1 1 1 1 ($2^{sd}$ step LP, $2^{sd}$ iteration)

and so on, until the following sequence is obtained:
0 0 0 0 0 0 0 0 0 0 0 0 0 1 0 0 ($2^{sd}$ step LP, $6^{th}$ iteration)

indicating thereby that the fourteenth data sample is the best one.

Still referring to FIG. 7, let us consider selection determination element SDi. A two-way selector 32-$i$ receives signal E'i (output by data edge memory element DEMi) on a first input and the signal, referred to as the selection signal Si, generated by the whole element SDi via loop 33-$i$ on a second input. Selector 32-$i$ is controlled by signal labeled Start generated by the control logic block 18. The signal that is output from selector 32-$i$, labeled Fi, is applied to a first input of two-way AND gate 34-$i$, the other input of which receives the ANDing result between signals Fi−1 and Fbi+1 (NOT Fi+1) through two-way NAND gate 35-$i$. AND gates 34-$i$ and 35-$i$ thus implement the first step of the above described two-step algorithm.

In turn, the signal Gi that is output from AND gate 34-$i$ is applied to a first input of two-way AND gate 36-$i$, the other input of which receives the result of ANDing signals Gbi−1 (NOT Gi−1) and Gi+1 through two-way NAND gate 37-$i$ to generate signal Hi. AND gates 36-$i$ and 37-$i$ thus implement the second step of the above described two-step algorithm. Finally, signal Hi is applied to the data input of flip-flop 38-$i$ to latch selection signal Si. The clock input of flip-flop 38-$i$ receives clock phase $C_1$. As apparent in FIG. 7, two INVERTER gates 39-$i$ and 40-$i$ respectively generates signals Fbi (NOT Fi) and Gbi (NOT Gi) from signals Fi and Gi.

As mentioned above, flip-flop 30-$i$ (see FIG. 6) collects the edge information using its asynchronous reset input. At the end of the edge information sampling time, the selection signal Start of selector 32-$i$ (delivered by the control logic circuit 18) switches to the '1' level during one clock period and then returns to '0'. When it returns to '0', flip-flop 30-$i$ can be synchronously set to '1' by having its clock input switching to '1' then back to '0'. The signal at the output of the selector 32-$i$ is combined using NAND, AND and INVERTER gates to execute the two steps of the above described algorithm.

The F signal of the previous SD element (SDi−1), i.e. Fi−1, is combined in a NAND gate with the inverted F value of the next SD element (SDi+1), i.e. Fbi+1. The resulting signal is then ANDed with the Fi signal to form the Gi signal, thus effectively detecting the occurrence of the 110 pattern and forcing the middle '1' to a '0' when the pattern is found. Similarly, the Gi signal is combined with the G signal from adjacent SD element to detect the 011 pattern and replace the middle value thereof by a '0' when this pattern is found.

The Hi signal is captured in flip-flop 38-$i$ at each clock phase $C_1$ rising edge to generate selection signal Si. By allowing the Hi signal to re-circulate through the selector 32-$i$ via loop 33-$i$, one can see that the width of the zone initially filled with '1's at the flip-flop 38-$i$ output of SDi element, will decrease until there is only one '1'. Extra iterations will be without any effect. The maximum number of iterations to be performed is equal to the fourth of the number of data samples in the case of DDR data (i.e. four iterations in the preferred implementation using sixteen samples per clock period) or one half of the number of data samples in the case of SDR data (i.e. eight iterations in the case of the preferred implementation). There is no penalty in having the data selection having to loop four or eight clock cycles as it is expected that the collection of data edges will last more time to ensure the data selection circuit 19 will take into account the data jitter.

FIG. 7 illustrates the assembly of 16 SD elements to build the totality of the selection determination circuit 15. The selection signals S(1:16) cannot be directly used to select the best data sample(s) to be kept as their values is subject to change between the different iterations. However, given the condition that the data edge collection delay in memory 14 is always greater than the iteration delay in circuit 15, the selection signals S(1:16) values are stored in a memory at the same time or just before taking new data edges are processed.

5. Description of the Selection Validation Circuit 16

Figure 8:
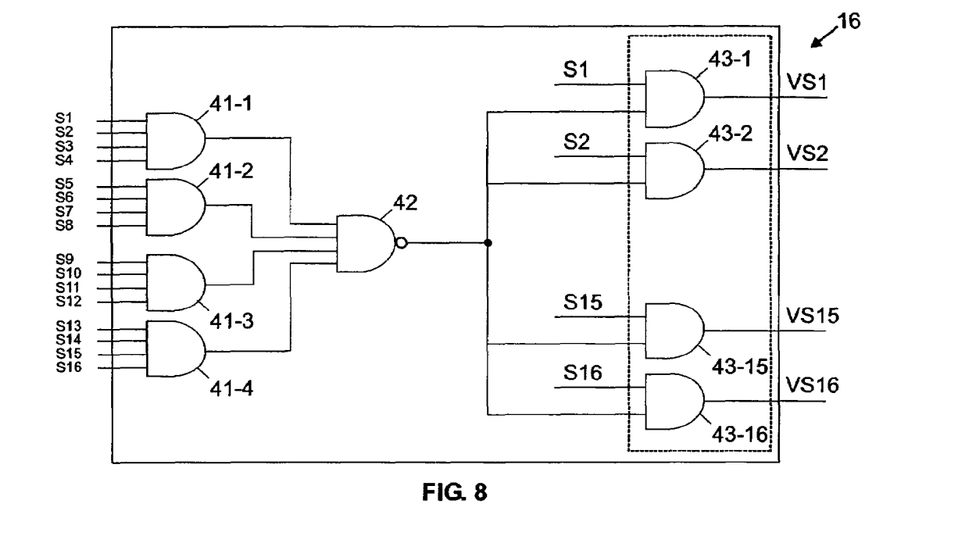
FIG. 8 is the circuit diagram of the selection validation circuit of FIG. 2.

FIG. 8 shows a preferred implementation of the innovative selection validation circuit 16 of FIG. 2 which is another key feature of the present invention, because it has the essential role of validating the selection. Now turning to FIG. 8, a group of four four-way AND gates referenced 41-1 to 41-4 processes the selection signals $S_1$ to $S_{16}$, four per four. The outputs of these four AND gates are connected to the respective inputs of four-way NAND gate 42. In turn, the signal that is output from NAND gate 42 is applied to a first input of a battery of 16 two-way AND gates referenced 43-1 to 43-16. The respective selection signal is applied on the second input of each of these two-way AND gates, for instance selection signal $S_1$ is applied to AND gate 43-1 to generate signal $VS_1$ and so on.

If for some reason, there is no data edge during the period between two RC (reset clock) signals, the selection determination circuit 15 will incorrectly indicate that each data sample is to be recovered by setting each selection signal S(1:16) to the '1' level. To avoid data recovery errors, the selection validation circuit 16 disable all selection signals when they all are at the '1' level. As apparent in FIG. 8, selection signals $S_1$ to $S_{16}$ are ANDed in two steps, first in AND gates 41-1 to 41-4, then in NAND gates 42 for technology reasons. As a result, NAND gate 42 output is at '1', if at least one selection signal is at '0' and at '0' otherwise. This output is then used as the validation signal for the selection signals $S_1$ to $S_{16}$. Therefore, $VS_1$ to $VS_{16}$ designate the selection signals that have been validated.

It should be noted that the determination of the best selection signals and their validation performed in circuits 15 and 16 only imply the use of only combinatorial logic instead of complex computation means such as a microprocessor.

6. Description of the Selection Memory Block 17

Figure 9:
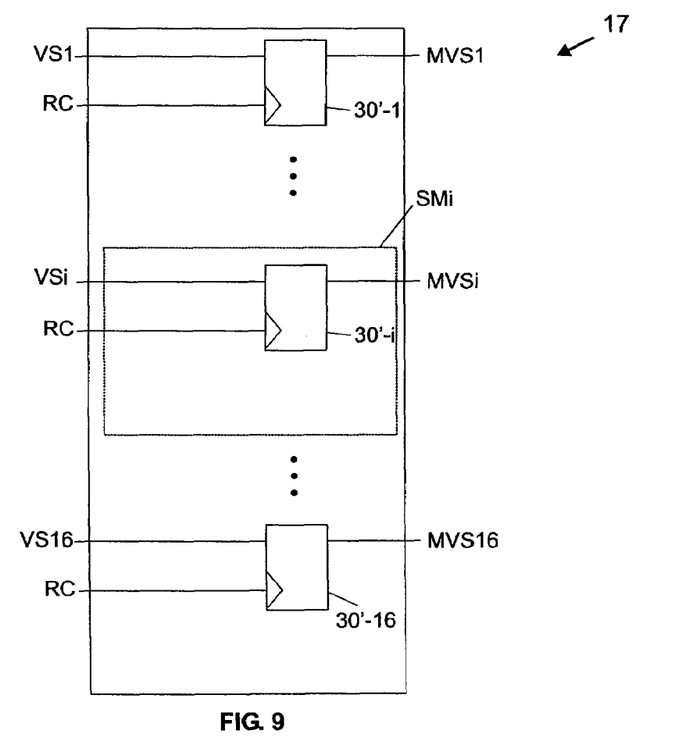
FIG. 9 is the circuit diagram of the selection validation memory of FIG. 2.

At this point, it is important to memorize the validated values of the selection signals, i.e. $VS_1$ to $VS_{16}$, so that these values can be used while new data edges are processed and new selection signals are updated. Selection memory block 17 can have a similar construction to the data edge memory block 14. Now turning to FIG. 9, let us consider selection memory element SMi, which simply consists of asynchronous reset flip-flop 30'-$i$, the validated signal VSi is applied to its asynchronous input and its clock input connected to the reset signal RC. The signal latched in flip-flop 30'-$i$, labeled MVSi, is kept for an extended length of time such as several tenths or hundreds of the reference clock period. The memorized validated selection signals in flip-flops 30'-1 to 30'-16 are labeled $MVS_1$ to $MVS_{16}$ respectively.

7. Description of the Data Sample Selection Circuit 19

Figure 10:
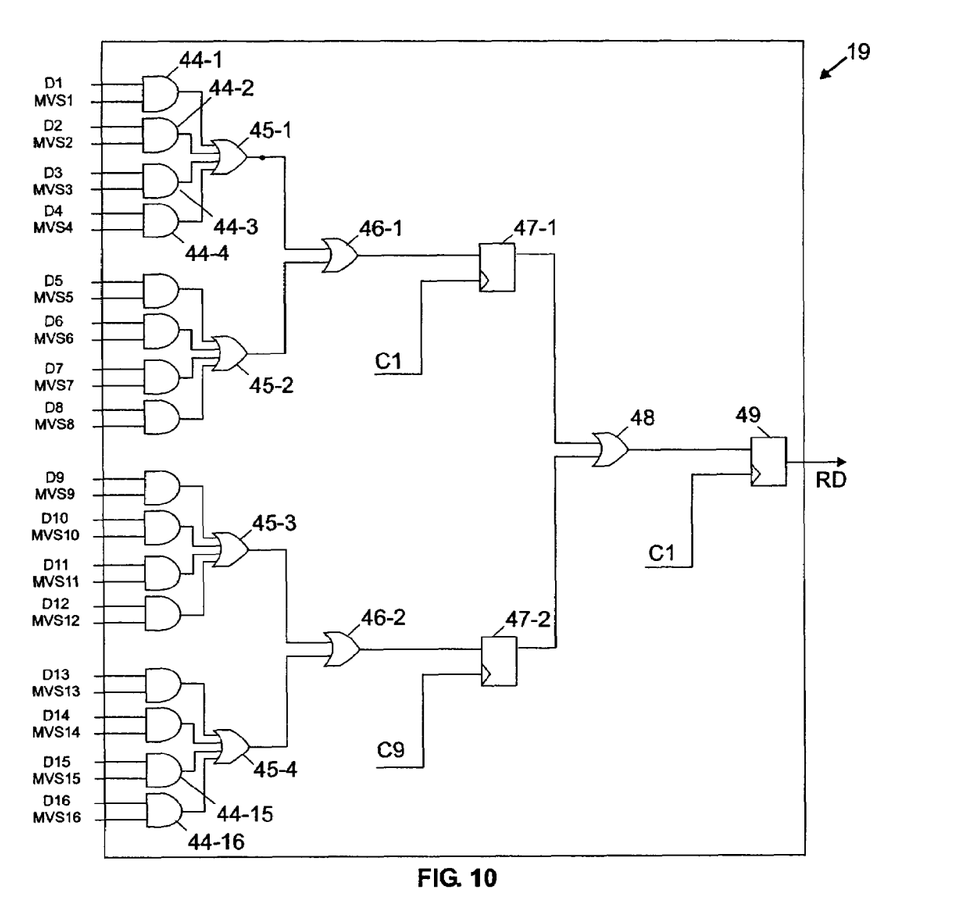
FIG. 10 is the circuit diagram of the data selection circuit of FIG. 2.

The data sample selection circuit 19 is depicted in FIG. 10. It first includes four groups of four two-way AND gates referenced 44-1 to 44-16. In each group, the output of the four AND gates is connected to one input of a four-way OR gate. As apparent in FIG. 10, these OR gates are referenced 45-1 to 45-4. The outputs of OR gates 45-1 and 45-2 are connected to an input of a two-way OR gate 46-1. Likewise, the outputs of OR gates 45-3 and 45-4 are connected to an input of a two-way OR gate 46-2. The output of OR gate 46-1 is connected to the data input of flip-flop 47-1 whose clock input receives clock phase $C_1$. Similarly, the output of OR gate 46-2 is connected to the data input of flip-flop 47-2 whose clock input receives clock phase $C_9$ (in phase opposition with clock phase $C_1$). Signals latched in flip-flops 47-1 and 47-2 are applied to two-way OR gate 48, the output of which is connected to the data input of flip-flop 49. Its clock input is driven by clock phase $C_1$. The signal latched in flip-flop 49 is the recovered data RD.

The data selection circuit 19 shown in FIG. 10 illustrates how the memorized selection signals are exploited to recover the data. The best data sample is selected using AND gates (or AND-OR gates). The different combinations are then further combined using OR gates. If the data to recover is coming from the $D_1$ to $D_8$ range, it can be safely captured by the $C_1$ clock phase. On the contrary, if it comes from the $D_9$ to $D_{16}$ range, it is captured by the $C_9$ clock phase. The OR gate 48 then combines the data coming from flip-flops 47-1 and 47-2 and the recovered data RD is captured by the $C_1$ clock phase.

In the case of DDR data, two circuits 19'/19" identical to the data sample selection circuit 19 of FIG. 10 would then be necessary. An additional requirement would be that each circuit uses two different set of memorized validated selection signals MVS(1:16), each one pointing a different data sample to recover. Such a circuit able to split the present set of the validated selection signals VS(1:16) in two sets is not shown but could be easily designed by an ordinary skilled professional.

The improved data recovery circuit 10 schematically shown in FIG. 2 is very simple and do not require high speed performance. The disclosed method is based on collecting all data edges, then locating the edges in the sampling window in the eye diagram and finally locating the zone of stable data where the data can be safely recovered. The disclosed method allows one to take into account the random data jitter. Because it is only based on data edge detection, it is does not depend on the data communication protocol that is used.

It will be apparent to those skilled in the art having regard to this invention that other modifications of this invention beyond those embodiments specifically described here may be made without departing from the spirit of the invention. Accordingly, such modifications are considered within the scope of the invention as limited solely by the appended claims.

What is claimed is:

1. A method for recovering the data in an incoming data stream with jitter and skewed with respect to a reference clock comprising the steps of:
   oversampling the incoming data stream with the n phases of the reference clock to generate a set of n data samples;
   detecting the position of the data edges, of transitions, in the set of data samples and, creating a map of n bits, representing the data edge information, by assigning a determined binary logic value to said data edge positions and the opposite value otherwise;
   memorizing the map of n bits wherein the bits are at a first binary logic level for detected data edges and at a second binary logic level otherwise and wherein the last bit map position is considered as adjacent to the first bit map position, and conversely;
   using the memorized data edges for generating selection signals by locating a zone filled with binary values representative of said second binary logic level in said bit map and reducing the width of said second binary logic level by performing successive iterations alternatively on the two sides of the zone until it only contains one value at said second binary logic level;
   determining which data sample is the farthest from the data edges;
   validating said selection signals to generate validated selection signals to avoid false determination due to jitter and skew;
   memorizing said validated selection signals; and using said memorized validated selection signals and said data samples to select the data sample farthest from the data edges.

2. The method of claim 1 wherein the bit map is memorized during several reference clock periods.

3. The method of claim 1 wherein said determination consists to compare two consecutive data samples and to generate a corresponding set of signals representing the data edge information so that when a transition is detected between two consecutive data samples the signal is a first logic level and at a second logic level otherwise.

4. The method of claim 1 wherein said oversampling is performed by using the multiple phases of a reference clock.

* * * * *